United States Patent [19]

Kanzaki et al.

[11] Patent Number: 4,895,814

[45] Date of Patent: Jan. 23, 1990

[54] PROCESS FOR PRODUCING ALUMINA SILICA SINTERED CERAMICS HAVING IMPROVED HIGH-TEMPERATURE STRENGTH

[75] Inventors: Shuzo Kanzaki; Hideyo Tabata; Osami Abe; Ohta Shigetoshi, all of Aichi; Yamagishi Chitake, Tokyo; Mitachi Senshu, Kanagawa, all of Japan

[73] Assignees: Agency of Industrial Science and Technology, Tokyo; Mino Yogyo Co., Ltd., Gifu; Nihon Cement Co., Ltd.; Hokko Chemical Industry Co., Ltd., both of Tokyo, all of Japan

[21] Appl. No.: 66,697

[22] Filed: Jun. 24, 1987

Related U.S. Application Data

[63] Continuation-in-part of Ser. No. 868,810, May 29, 1986, abandoned.

[30] Foreign Application Priority Data

May 30, 1985 [JP] Japan .................. 60-117646

[51] Int. Cl.⁴ ............................................. C04B 35/18
[52] U.S. Cl. ................................... 501/128; 501/133; 423/327; 264/66
[58] Field of Search ............. 501/128, 133; 423/327; 264/66

[56] References Cited

U.S. PATENT DOCUMENTS

| | | | |
|---|---|---|---|
| 3,533,738 | 10/1970 | Rundell et al. | 501/128 |
| 3,857,923 | 12/1974 | Gardner et al. | 423/327 |
| 3,922,333 | 11/1975 | Mazdiyasni et al. | 423/327 |
| 4,266,978 | 5/1981 | Prochazka | 501/153 |
| 4,272,500 | 6/1981 | Eggerding et al. | 423/327 |
| 4,286,024 | 8/1981 | Yoldas | 428/446 |
| 4,384,046 | 5/1983 | Nakagami | 501/95 |
| 4,418,024 | 11/1983 | Prochazka et al. | 264/1.2 |
| 4,418,025 | 11/1983 | Prochazka et al. | 264/1.2 |
| 4,427,785 | 1/1984 | Prochazka et al. | 501/128 |
| 4,593,007 | 6/1986 | Novinski | 501/105 |

FOREIGN PATENT DOCUMENTS

| | | |
|---|---|---|
| 3318088 | 5/1983 | Fed. Rep. of Germany . |
| 3317815 | 12/1983 | Fed. Rep. of Germany . |
| 58-199712 | 11/1983 | Japan . |
| 58-199713 | 11/1983 | Japan .................. 423/327 |
| 59-195520 | 11/1984 | Japan . |
| 60-118615 | 6/1985 | Japan .................. 423/327 |
| 60-145902 | 8/1985 | Japan .................. 423/327 |
| 60-161371 | 8/1985 | Japan . |
| 236649 | 10/1986 | Japan . |

OTHER PUBLICATIONS

Mah et al, "Mechanical Prop. of Mullite", J. Am. Ceramic Soc., vol. 66, pp. 699–703 (10-83).
Dokko et al, High Temp. Mech. Prop. of Mullite Under Compression, J. Am. Ceramic Soc., vol. 60, pp. 150–155 (Mar.-Apr. 1977).

(List continued on next page.)

*Primary Examiner*—William R. Dixon, Jr.
*Assistant Examiner*—Ann M. Knab
*Attorney, Agent, or Firm*—Frishauf, Holtz Goodman & Woodward

[57] ABSTRACT

An alumina silica sintered ceramic that is produced by the normal sintering method and which has bending strength of at least 300 MPa at room temperature and at least 400 MPa at an elevated temperature, for example, 1,300° C. is disclosed.

This sintered ceramic is produced by a process comprising the following steps: providing a chiefly amorphous starting powder that consists of 62–73 wt % $Al_2O_3$ and correspondingly 38–27 wt % $SiO_2$; calcining this starting powder to make a calcined product that is chiefly composed of a crystalline phase and which contains oxides of an alkali metal and an alkaline earth metal in a total amount of no more than 1,500 ppm; pressing the ground particles of the calcined product into a compact; and sintering the compact at 1,500°–1,750° C. and at atmospheric pressure.

22 Claims, 2 Drawing Sheets

OTHER PUBLICATIONS

Mazdiyasni et al, "Synthesis & Mech. Props. of Stoichiometric Aluminum Silicate", Report on 14th Annual Meeting of Am. Ceramic Soc. (1972), pp. 548–552.

Kanzaki et al, "Sintering & Mech. Prop. of Stoich. Mullite", J. Am. Ceramic Soc., 68(1), C-6–C-7 (1985).

Kanzaki et al, "Effects of Mullite Comp. on Its Microstructure and Strength", Preprint distributed at 23rd Symposium on Ceramic Basic Science, Tokyo, 1985 (5 pages).

Roy et al, "Preparation of Fine Oxide Powders by Evaporative Decomposition of Solutions" Ceramic Bulletin, vol. 56, No. 11 (1977), pp. 1023–1024.

Kanzaki et al, "Characterization of Spray-Pyrolyzed Spinel Powders" Yogyo-Kyokai-Shi, vol. 91(2), 1983, pp. 81–86 (English language translation of Abstract only).

PROCESS FOR PRODUCING ALUMINA SILICA SINTERED CERAMICS HAVING IMPROVED HIGH-TEMPERATURE STRENGTH

This invention is a continuation-in-part application of U.S. Ser. No. 868,810, now abandoned filed May 29, 1986.

BACKGROUND OF THE INVENTION:

1. Field of the Invention

The present invention relates to mullite-crystal based alumina silica sintered ceramics (this term is hereinafter simply referred to as sintered ceramics) that are excellent not only in bending strength at room temperature (this bending strength is hereinafter simply referred to as room-temperature strength) but also in bending strength at temperatures of 800° C. or higher, specifically at a high temperature of 1,300° C. (this bending strength is hereinafter simply referred to as hot strength) and which displays high absolute values of these two types of bending strength. The present invention also relates to a process for producing such sintered ceramics by the normal sintering method.

More specifically, the present invention relates to the mullite-crystal based sintered ceramics that are produced by first providing a chiefly amorphous starting powder that is composed of alumina and silica, calcining the powder to the crystalline state, shaping (molding) the calcined powder into a compact, and sintering the compact at atmospheric pressure. The resulting sintered ceramics are suitable for use in the manufacture of firing burner nozzles, parts of internal combustion engines, high-temperature jigs and in other applications that require room-temperature strengths of at least 300 MPa and hot strengths of at least 400 MPa. The present invention also relates to a process for producing such sintered ceramics.

DESCRIPTION OF THE PRIOR ART

Mullite is well known as one of the mineral compositions of alumina silica sintered ceramics. Mullite ($3Al_2O_3 \cdot 2SiO_2$) and compositions in the neighborhood thereof have particularly good thermal stability characteristics (e.g. thermal expansion coefficient, resistance to thermal shock, and creep characteristics at high temperatures) among the known binary systems of $Al_2O_3$ and $SiO_2$ and, hence, are considered to have potential for use in the special applications mentioned in the preceding paragraph.

There are three basic methods for producing the sintered ceramics. The first method is hot pressing in which compaction and sintering are effected simultaneously to make a sintered ceramic. The second method is hot isostatic pressing in which a compact of an amorphous starting powder is sintered and subjected to hot isostatic pressing. The third method is normal sintering in which a compact is sintered at atmospheric pressure.

The prior art of the first two methods is hereinafter described with reference to patent and general literature. U.S. Pat. No. 3,922,333 to Mazdiyasni et al. shows that a sintered ceramic having the stoichiometric mullite composition (71.8 wt % $Al_2O_3$ and 28.2 wt % $SiO_2$) was prepared by calcining a starting powder at 500°–700° C. and vacuum hot pressing the calcined powder at 1,300°–1,600° C. and that the resulting sintered ceramic had a room-temperature strength of 269 MPa ($39 \times 10^3$ psi) Mah and Mazdiyasni prepared a sintered ceramic of the stoichiometric mullite composition by the same method and reported the following in "Mechanical Properties of Mullite", J. Am. Ceram. Soc., 66 [10], 699–703 (1983): measurements of the bending strength of the sintered ceramics over the range of from room temperature to 1,500° C. revealed a slight increase with increasing temperature but the absolute values of its room-temperature strength and hot-strength were very low (ca. 130 MPa at room temperature and ca. 145 MPa at 1,500° C.).

Prochazka et al. were granted U.S. Pat. Nos. 4,418,024 and 4,418,025 for optically translucent sintered ceramics having 74–76.5 wt % $Al_2O_3$ and the balance $SiO_2$. They were also granted U.S. Pat. No. 4,427,785 for an optically translucent sintered ceramic having 72.5–74 wt % $Al_2O_3$ and the balance $SiO_2$.

The processes employed to produce the sintered ceramics described in these patents to Prochazka et al. and the characteristics of these sintered ceramics are substantially the same, so it will be sufficient to discuss only U.S. Pat No. 4,427,785 which discloses a sintered ceramic having the chemical composition of which partly overlaps the composition specified by the present invention.

The optically translucent sintered ceramic disclosed in U.S. Pat. No. 4,427,785 is prepared by a process comprising the following steps: mixing aluminum secondary butoxide with ethyl silicate and hydrolyzing the mixture to form a precipitate; freeze-drying the precipitate to make a starting powder composed of 72.5–74 wt % $Al_2O_3$ and the balance $SiO_2$; calcining the starting powder by heating at 490°–1,100° C. so as to remove water and any organic material from said powder; pressurizing the resulting amorphous calcined product into a compact; sintering the compact at 1,500°–1,675° C. in oxygen or in vacuum; hot isostatically pressing the sintered ceramic at 1,500°–1,700° C. and at 5,000 psi (ca. 34.5 MPa); and optionally annealing the sintered ceramic at 1,700°–1,850° C. This process involves several cycles of heating at elevated temperature (i.e., sintering, hot isostatic pressing, and annealing) for the purpose of producing larger crystals and affording improved optical transparency. On the other hand, in order that crystals in the sintered ceramics grow up excessively, its room-temperature strength and hot strength are low (120±30 MPa and 90±40 MPa, respectively).

A special case of the use of hot pressing is shown in JA 60-161371 (Japanese Patent Public Disclosure No. 161371/1985). In Example 1 of this patent, a starting powder made to have the mullite composition (71.8 wt % $Al_2O_3$ and 28.2 wt % $SiO_2$) was calcined and then vacuum hot-pressed at 1,600° C. and at 500 kgf/cm$^2$. The resulting sintered ceramic had a room-temperature strength of 589 MPa (60 kgf/mm$^2$) and a hot strength of 481 MPa (49 kgf/mm$^2$).

The biggest problem with the above-described hot pressing and hot isostatic pressing methods is that they are capable of producing only sintered ceramics that have a simple geometry such as a prism shape and that it is very difficult to attain sintered ceramics of complex shapes which are suitable for use in the production of firing burner nozzles, parts of internal combustion engines, high-temperature jigs and in other applications that require room-temperature strengths of at least 300 MPa and hot strength of at least 400 MPa.

Compared with these methods, the normal sintering method is capable of producing complicatedly shaped sintered ceramics and, therefore, it has recently become the subject of re-evaluation and intensive studies by many researchers.

The normal sintering method and the characteristics of sintered ceramics produced by this method are hereinafter described. In Kanzaki et al, "Sintering and Mechanical Properties of Stoichiometric Mullite", J. Am. Ceram. Soc., 68 [1]C-6 and C-7 (1985), a mixture of aluminum nitrate and ethyl silicate was sprayed into a quartz tube heated at 350°-650° C. so as to make an amorphous starting powder, and this powder was calcined at 1,000° C. and sintered at 1,650° C. at atmospheric pressure to make a sintered ceramic of the mullite composition. The bending strength of the resulting sintered ceramic remained substantially constant at ca. 360 MPa over the range of from room temperature to 1,300° C.

In JA 61-236649 (Japanese Patent Public Disclosure No. 236649/1986), a mixed solution of 69–79 wt % $Al_2O_3$ and 21–31 wt % $SiO_2$ was spray-dried to form a starting powder, which was then shaped into compact and sintered at atmospheric pressure. The resulting sintered ceramics had an average room-temperature strength of 347 MPa (35.4 kgf/mm$^2$) but their average hot strength fell to as low as 281 MPa (28.6 kgf/mm$^2$).

The preprint distributed for the 23rd Symposium on Ceramic Basic Science held in Tokyo in 1985 contains the following information: mixed solution of aluminum nitrate and ethyl silicate was subjected to spray pyrolysis at 450° C. to make a starting powder composed of 68–78 wt % $Al_2O_3$ and the balance $SiO_2$; the powder was calcined at 950° C. and shaped into a compact, which was sintered at 1,630° C. and at atmospheric pressure. The resulting sintered ceramic had a room-temperature strength ranging from 284 MPa (29 kgf/mm$^2$) to 324 MPa (34 kgf/mm$^2$) and a hot strength ranging from 221 MPa (22.5 kgf/mm$^2$) to 441 MPa (45 kgf/mm$^2$). However, the curves for room-temperature strength and hot strength crossed at a certain temperature and it was impossible to attain a sintered ceramic of any chemical composition that would display adequately high values of both room-temperature strength and hot strength.

A process of normal sintering which is substantially the same as the above-described method is shown in Examples 2 and 3 of the invention disclosed in JA 60-161371. The only difference is that the sintered product has a molar ratio of $Al_2O_3$ to $SiO_2$ within the range of 3:2 to 3.05:1.95. This product had a comparatively high room-temperature strength in the range of 441–471 MPa (45–48 kgf/mm$^2$). However, its hot strength fell remarkably to 314–343 Mpa (32–35 kgf/mm$^2$).

JA 59-195520 (Japanese Patent Public Disclosure No. 195520/(1984)discloses a special method of preparing a starting powder for use in the production of a sintered ceramic. According to this method, an aluminum alkoxide and a silicon alkoxide are first dissolved in benzene with heat and the resulting mixture is charged into a pressure vessel in which it is heated at 300° C. for 30 minutes at 7,112 psi (500 kgf/cm$^2$) with water being used as a catalyst. In the next place, the pressure in the vessel is restored to one atmosphere and filled with water after the internal temperature has been elevated to 600° C. The vessel is again pressurized to 2,845 psi (200 kgf/cm$^2$), held at that value for 2 hours, and restored to one atmosphere. The resulting reaction product may be dried to obtain a starting mullite powder of low crystallinity.

JA 59-195520 does not disclose any process for producing a sintered ceramic from the so prepared starting powder. Therefore, the present inventors prepared a sintered ceramic from this starting powder by a routine method which consisted of calcination at 600° C. and normal sintering at 1,600° C. The resulting sintered ceramic had a room-temperature strength of 195 MPa but its hot strength fell to 193 MPa.

As will be understood from the foregoing discussion, the sintered ceramics produced by the prior art methods of normal sintering are defective in one way or another: some of them have low absolute values of both room temperature strength and hot strength, others are satisfactory in room temperature strength but not so in hot strength, and others have satisfactory hot strength but do not afford adequate room-temperature strength. Because of these problems, none of the prior art products are suitable for use in applications that require room-temperatures of at least 300 MPa and hot strengths of at least 400 MPa, and they find utility only in those areas where low bending strengths are permissible.

The present inventors conducted extensive research in order to identify the reasons why the sintered ceramics that are produced by the prior art methods of normal sintering fail to display high values of both room-temperature strength and hot strength. As a result, the following three were found to be the probable causes:

(a) impurities, in particular, oxides of alkali metals and alkaline earth metals, form a glass phase of low melting point and low viscosity in the grain boundaries of mullite crystals in the sintered ceramic;

(b) the starting powder is not uniform in its chemical composition and has a local deviation and, as a result, a glass phase forms during sintering in an amount that is greater than what is predicted from the initial chemical composition; and (c) when the chiefly amorphous calcined product of the starting material is sintered, it shrinks by a large amount as its structure changes from the amorphous to crystalline state and this produces tiny cracks in the resulting sinter.

Based on these observations, the present inventors conducted concerted studies which have finally lead to the accomplishment of the present invention which is to be described in the following pages.

SUMMARY OF THE INVENTION:

A first object of the present invention is to provide a process for producing an alumina silica sintered ceramic by normal sintering.

A second object of the present invention is to provide an alumina silica sintered ceramic that has a room-temperature strength of at least 300 MPa and a hot (1,300° C.) strength of at least 400 MPa.

The sintered ceramic of the present invention which has a room-temperature strength of at least 300 MPa and a hot strength of at least 400 MPa is produced by a process comprising the following steps: preparing from a homogeneous mixture of solution state a chiefly amorphous starting powder (or powder mixture) that is conditioned to a chemical composition within the range of 62–73 wt % $Al_2O_3$ and 27–38 wt % $SiO_2$; calcining the starting powder to form a powder that is chiefly composed of a crystalline phase and which contains oxides of an alkali metal and an alkaline earth metal in a total amount of no more than 1,500 ppm; grinding the calcined product into particles and shaping (molding) them into a compact under pressure; and sintering the compact in air or an inert atmosphere at a temperature of 1,500°–1,750° C. and at atmospheric pressure.

Figure 1:
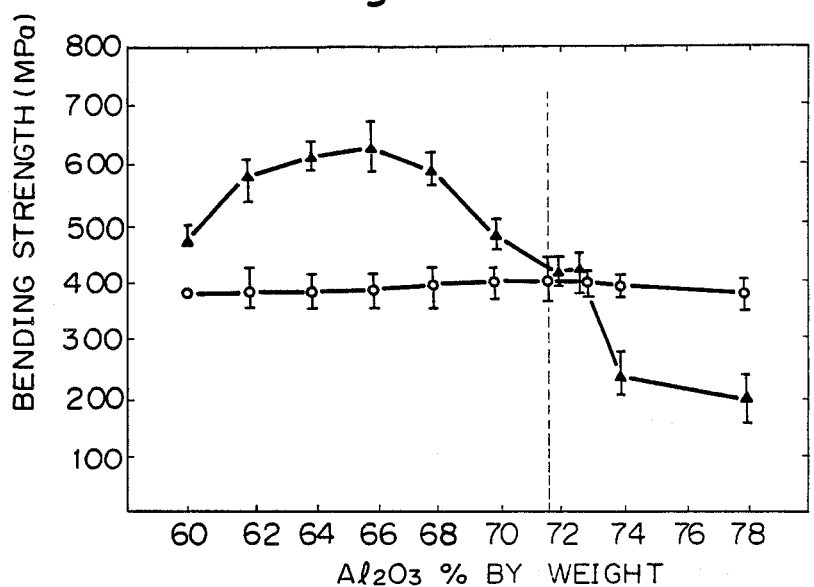
FIG. 1 shows the results of a three-point bending test conducted both at room temperature and at 1,300° C. for various sintered ceramics prepared from powder mixtures which were synthesized by spray pyrolysis of solutions wherein aluminum nitrate and ethyl orthosilicate were mixed to give varying proportion of $Al_2O_3$.

DETAILED DESCRIPTION OF THE INVENTION:

The present invention provides a process for producing an alumina silica sintered ceramics by normal sintering and the resulting sintered ceramic has a room-temperature strength of at least 300 MPa and a hot strength of at least 400 MPa.

In order to attain these strength characteristics, the following three requirements must be satisfied by the production process: i) the powder mixture or the starting powder has a chemical composition of 62–73 wt % $Al_2O_3$ and 27–38 wt % $SiO_2$; ii) the calcined product (such as the calcined powder) is chiefly composed of a fine crystalline phase and contains oxides of an alkali metal and an alkaline earth metal in a total amount of no more than 1,500 ppm; and iii) the compact made of the calcined powder is sintered at a temperature of 1,500°–1,750° C. and at atmospheric pressure.

The process for producing the sintered ceramic of the present invention is hereinafter described in detail.

The starting powder used in the present invention is composed of amorphous aluminum and silicon compounds and may sometimes contain a minor portion of crystalline phase. It is important that this starting powder be chemically homogeneous and contain minimum amounts of oxides of alkali metal and alkaline earth metal as impurities.

To this end, the starting powder is desirably synthesized from aluminum and silicon sources that contain oxides of an alkali metal and an alkaline earth metal in the smallest possible amounts. If there is no alternative but to use aluminum and silicon sources that contain fairly large amounts of such oxides, they must be first subjected to distillation, recrystallization or washing in order to reduce the contents of oxides to the desired levels.

In order to attain a chemically homogeneous starting powder, an aluminum and a silicon source must be mixed in the state of solution, or at the atomic level. This can be achieved by any of the known methods of synthesis, which include the following:

(1) an aluminum salt and a silicon alkoxide each having a high purity are dissolved in a solvent such that desired proportions of $Al_2O_3$ and $SiO_2$ are attained and the resulting mixed solution is subjected to spray pyrolysis to make the intended starting powder; and (2) a blend in which an aluminum alkoxide and a silicon alkoxide are incorporated in predetermined proportions is mixed with an organic solvent and water and subjected to hydrolysis and the resulting precipitate is separated and dried to make the intended starting powder.

Needless to say, other methods of synthesis may be employed to make a starting powder which is suitable for use in the present invention.

Before calcining the starting powder, analysis is conducted to verify that the contents of $Al_2O_2$ and $SiO_2$ in the powder are within the ranges of 62–73 wt % and 27–38 wt %, respectively. The present inventors have confirmed that the chemical composition of the starting powder is maintained until after sintering is completed.

If the $Al_2O_3$ content of the starting powder is less than 62 wt %, the relative content of $SiO_2$ is undesirably high and a sintered ceramic that is rich in a glass phase will result. Such a sintered ceramic does not have a sufficient creep resistance at high temperatures to render it suitable for use in practical applications. If the $Al_2O_3$ content of the starting powder exceeds 73 wt %, the hot strength of the resulting sintered ceramic is significantly reduced and the desired minimum level of 400 MPa is not attainable.

A preferable chemical composition of the starting powder is within the range of 62–72 wt % $Al_2O_3$ and 28–38 wt % $SiO_2$. From the viewpoint of hot strength, the most preferable range is from 62 to less than 68 wt % for $Al_2O_3$ and from more than 32 to 38 wt % for $SiO_2$.

According to X-ray diffraction, the starting powder is chiefly amorphous but the present invention permits the case where part of the powder is made of a crystalline phase.

The sample to be subjected to quantitative analysis of impurities may be a starting powder or a calcined product thereof and in the present invention, the latter is used as a sample because it is easier to analyze. A detailed discussion of impurities will be made in the following description of the calcined product.

In the next step, the starting powder is calcined to form a product that is composed of a fine crystalline phase. Calcining of the starting powder is performed at a temperature of from about 900° to about 1,450° C., preferably 1,100°–1,400° C., more preferably 1,150°–1,350° C., in air for a period of at least half an hour. If the calcining temperature is less than 900° C., the starting powder will not become crystalline.

The contents of oxides of an alkali metal, an alkaline earth metal and otherwise in the calcined product (or calcined powder) can be determined by either atomic absorption spectroscopy or inductively coupled plasma emission spectrometry. The fact that the calcined product is composed of a crystalline phase can be confirmed by X-ray diffraction.

Alkali metal oxides as impurities present in the calcined product may be illustrated by $Na_2O$, $K_2O$ and $Li_2O$, and exemplary oxides of alkaline earth metals are MgO and CaO.

The sum of the contents of oxides of alkali metal and alkaline earth metal in the calcined product should not exceed 1,500 ppm, and a preferable level is less than 1,000 ppm.

The total content of the oxides of alkali metal and alkaline earth metal is one of the important factors of the present invention. If the combined amounts of the two oxides exceed 1,500 ppm, the following undesired results will occur; if a SiO$_2$-rich sintered ceramic that contains no more than 71.8 wt % Al$_2$O$_3$ and no less than 28.2 wt % SiO$_2$ is produced, excessive amounts of the oxides are dissolved as modifier ions in the SiO$_2$-based glass phase that exists in the grain boundary of mullite crystals, and such excess modifier ions reduce the viscosity of the glass phase to cause an appreciable fall in the hot strength of the resulting sintered ceramic.

Alkali metal oxides have particularly great effects on the viscosity of the SiO$_2$-based glass phase at high temperatures, so that care must be taken to minimize the entrance of such oxides into the sintered ceramic being produced. The content of alkali meal oxide in the calcined powder is preferably no more than 1,000 ppm, with values of 500 ppm and less being more preferable.

Other impurities that may be included in the calcined powder are exemplified by Fe$_2$O$_3$ and TiO$_2$ which accompany the aluminum and silicon sources from which the starting powder is synthesized. Although such impurities have less effects on bending strength than the oxides of alkali metal and alkaline earth metal, it is needless to say that the starting powder to be calcined is preferably synthesized from aluminum and silicon sources that contain minimum amounts of such impurities.

The other important factor of the calcined powder is that it is composed of a fine crystalline phase and that the initial amorphous structure of the starting powder has virtually disappeared.

None of the sintered ceramics produced by the prior art methods have developed satisfactory levels of room-temperature strength or hot strength, because in the prior art the principal purpose of calcining is to remove water and any organic material from the starting powder by evaporation (see U.S. Pat. No. 3,922,333 to Mazdiyasni et al.) and because the resulting calcined powder is mostly amorphous. If such an amorphous calcined powder is shaped into a compact and sintered, the resulting sintered ceramic will undergo shrinking stress which causes microcracks to develop in the sintered ceramic. Not only do these microcracks decrease the bending strength of the sintered ceramic but they also cause increased variation in its bending strength and thereby impair its reliability.

In order to solve these problems of the prior art techniques, the present invention sees it very important that the calcined powder be composed of a fine crystalline phase.

The crystalline product obtained by calcinating the starting powder is then ground into particles with care being taken to avoid entrance of impurities. There is no particular limitation on the methods that can be employed to grind the calcined product into particles. If a vibration mill or a rotary mill is used, it is preferable for the purpose of avoiding entrance of impurities that the grinder is lined with a wear-resistant material (e.g. mullite or silicon nitride) or employs media of such a material. Organic impurities will be decomposed and evaporated during sintering, so that if the impurities that are to enter the calcined product during grinding are organic matters, the calcined product may be ground with a device that is lined with a resin material such as nylon or polyester (provided that it does not contain any inorganic filler) or which employs media of such a resin material.

The calcined product is ground into particles having an average size of no more than 1.0 $\mu$m, preferably no more than 0.5 $\mu$m. If the average size of the ground particles is more than 1.0 $\mu$m, they cannot be compacted to a high density that is desired for ensuring good sinterability and the resulting sintered ceramic may sometimes fail to develop the desired bending strength.

The ground particles of the calcined product are pressed into a compact of a predetermined shape by any of the commonly employed methods. Shaping is preferably conducted at a pressure of no lower than 500 kgf/cm$^2$.

The resulting compact is subjected to normal sintering at a temperature of 1,500°–1,750° C. in air or in an inert atmosphere (e.g. nitrogen or argon gas) and at atmospheric pressure. A preferable sintering temperature ranges from 1,500° to 1,700° C., the most preferable range is from 1,550° to 1,700° C. If the sintering temperature exceeds 1,750° C., part of the SiO$_2$ in the resulting mullite crystalline phase will be decomposed and evaporated to cause a variation in the chemical composition of the sintered ceramic. In addition, excessive growth of crystals will occur in the sintered ceramic so as to embrittle its surface and reduce its bending strength.

According to the process of the present invention which comprises the foregoing steps, a dense sintered ceramic having a density of at least 95% of the theoretical value can be produced. This sintered ceramic has a room-temperature strength of at least 300 MPa and a hot strength of at least 400 MPa, so that it is useful in such special applications as burner nozzles which are constantly exposed to high temperatures during service, parts of internal combustion engines and other apparatus that are used at high pressures and with heat cycles undergoing great temperature differences, and jigs that are used at high temperatures and under high impact pressures.

The following examples are provided for the purpose of further illustrating the present invention but are in no sense to be taken as limiting.

Example 1

A commercial aluminum nitrate [Al(NO$_3$)$_3$·9H$_2$O] (guaranteed reagent) as an aluminum source and ethyl orthosilicate [Si(OC$_2$H$_5$)$_4$] (guaranteed reagent) as a silicon source were mixed in such proportions that the ratio of Al$_2$O$_3$ content in the starting powders to be prepared would be within the range of 60–78 wt %. The resulting mixes were dissolved in a 1:1 mixture of water and ethanol to prepare ten samples of solution.

Each of the solutions was subjected to spray pyrolysis at 650° C. to synthesize starting powders. Fluorescence X-ray analysis of the starting powders showed that they had Al$_2$O$_3$ contents of 60, 62, 64, 66, 68, 70, 71.8, 73, 74 and 78 wt %. Analysis by X-ray diffraction showed that all of these starting powders wee amorphous.

Each of these starting powders was placed in an alumina crucible and calcined in an electric furnace at 950° C. in air for a period of one hour.

X-ray diffraction of the resulting calcined products revealed that nine samples that had Al$_2$O$_3$ contents within the range of 60–74 wt % were composed of a mullite crystalline phase but that the sample containing 78 wt % Al$_2$O$_3$ was composed of a mullite crystalline phase and a very small amount of corundum crystalline phase ($\alpha$-Al$_2$O$_2$). Atomic absorption spectroscopy showed that all samples of calcined product had alkali metal oxide contents of about 300 ppm and alkaline earth metal oxide contents of about 60 ppm.

The agglomerated particles in each of the calcined products were disintegrated by the following procedures: each calcined product was charged into a vibration mill (lined with silicon nitride and employing silicon nitride media) together with ethanol, ground for 50 hours, and dried. Particle size measurement by the centrifugal sedimentation method showed that the ground particles of each calcined product had an average size of 0.4 μm.

The ground particles of each calcined product were pressed at 2,000 kgf/cm$_2$ to form a compact. The resulting compacts were subjected to normal sintering in air in an electric furnace at 1,650° C. for 4 hours so as to make sintered ceramic each having a size of 5×40×50 mm. The resulting ten samples of sintered ceramics had densities of at least 95% of the theoretic value.

Six test specimens (3×4×40 mm) were prepared from each of the sintered ceramics and three of them were used in measurements of room-temperature strength while the other three were used in measurements of hot strength at 1,300° C.

The results of measurements are shown in FIG. 1 in terms of mean values, in which ○ and ▲ denote the room-temperature strength and hot strength, respectively, and the dashed line indicates the position of the stoichiometric mullite composition (71.8 wt % Al$_2$O$_3$ and 28.2 wt % SiO$_2$).

As one can see from FIG. 1, the sintered ceramics produced by the process of the present invention had room-temperature strengths much higher than 300 MPa and hot strengths exceeding 400 MPa.

Example 2

A mixture of a commercial metallic aluminum powder (purity≧99.5 wt %) and isopropyl alcohol [i-C$_3$H$_7$OH] (guaranteed reagent) was heated under reflux to synthesize aluminum isopropoxide [Al(O-i-C$_3$H$_7$)$_3$].

In a separate step, a mixture of a commercial silicon tetrachloride [SiCl$_4$] (purity≧99.9%) and ethanol [C$_2$H$_5$OH] was heated under reflux to synthesize ethyl silicate [Si(OC 4].

The two alkoxides thus synthesized were mixed in such proportions that the ratio of Al$_2$O$_3$ in the starting powders to be prepared would be within the range of 60–78 wt %. The resulting mixes were dissolved in benzene to prepare ten samples of solution.

To each of these solutions, aqueous ammonia (pH 11) was added to cause hydrolysis. The resulting precipitate was recovered by filtration. The recovered precipitates were dried in hot air (60° C.) for 24 hours to synthesize starting powders. Analysis by X-ray diffraction showed that all of these starting powders were amorphous.

Sintered ceramics were produced from these starting powders in the same manner as employed in Example 1, except that calcination was conducted in air at 1,200° C. for 1 hour. Various measurements were also conducted in the same manner as in Example 1. The results of measurements were as follows.

All of the ten samples of calcined product were solely composed of a crystalline phase and the contents of alkali metal oxide and alkaline earth metal oxide in each calcined product were approximately 800 ppm and 140 ppm, respectively. The ground particles of each calcined product had an average size of 0.3 μm.

Figure 2:
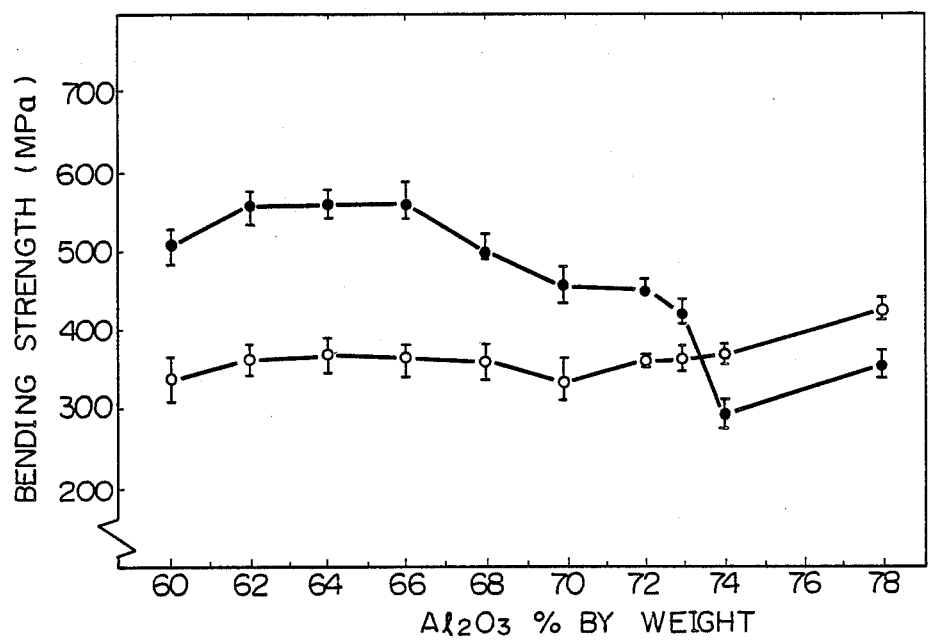
FIG. 2 shows the results of a three-point bending test conducted both at room temperature and at 1,300° C. for sintered ceramics prepared from powder mixtures which were synthesized by hydrolysis of solutions, wherein aluminum isopropoxide and ethyl orthosilicate were mixed to give varying proportions of $Al_2O_3$.

The results of measurements of the room-temperature strength and hot strength of the synthesized sintered ceramics are shown in FIG. 2, in which ○ and ● signify the room-temperature strength and hot strength, respectively. As one can see from FIG. 2, the room-temperature strengths and hot strengths of all samples exceeded the values of 300 MPa and 400 MPa, respectively, thereby attaining the objects of the present invention in a satisfactory manner. All of the sinters produced in Example 2 had densities of at least 95% of the theoretical value.

Examples 3–10 and Comparative Examples 1 and 2

Each of the aluminum isopropoxide and the ethyl silicate that were prepared in Example 2 was purified by distillation. The purified products were mixed in such proportions that the contents of Al$_2$O$_3$ and SiO$_2$ in the starting powder to be prepared would be 68 wt % and 32 wt %, respectively. The resulting mix was dissolved in benzene and aqueous ammonia (pH 11) was added to cause hydrolysis. To the resulting precipitate, a 0.1N NaOH solution and/or a saturated solution of Ca(OH)$_2$ was added dropwise under agitation so as to make ten samples, which were then evaporated to dryness under vacuum at 60° C. Each of the dried samples was disintegrated in a mortar to synthesize amorphous starting powders.

Sintered ceramics were produced from these starting powders by the same procedures as used in Example 2, except that calcination and sintering were conducted in the respective temperature ranges of 950°–1,400° C. and 1,650°–1,800° C. Various measurements were conducted as in Example 2. The specific conditions of production and the results of measurements are summarized in Table 1. X-ray diffraction showed that all of the calcined products were solely made of a crystalline phase. Each of the calcined products was ground into particles having an average size of 0.5 μm. As one can see from Table 1, the sintered ceramics that satisfied the requirements specified by the appended claims successfully attained the intended objects of the present invention. All of the sintered ceramics produced in Examples 3 to 10 had densities of at least 95% of the theoretical value.

TABLE 1

| | Calcined product | | | | | Bending strength of sintered ceramics (MPa) | |
|---|---|---|---|---|---|---|---|
| | alkali metal oxide | alkaline earth metal oxide | total | Calcination temperature | Sintering temperature | | |
| Run No. | (ppm) | (ppm) | (ppm) | (°C.) | (°C.) | R.T. | 1300° C. |
| Ex. 3 | 150 | 100 | 250 | 1200 | 1650 | 405 | 620 |
| 4 | 300 | 250 | 550 | " | " | 373 | 578 |
| 5 | 450 | 400 | 850 | 950 | " | 352 | 523 |
| 6 | " | " | " | 1200 | " | 361 | 540 |
| 7 | 750 | " | 1150 | " | " | 340 | 500 |
| 8 | 1050 | " | 1450 | " | " | 319 | 465 |
| 9 | 450 | " | 850 | 1400 | " | 354 | 522 |
| 10 | 750 | 700 | 1450 | 1200 | " | 322 | 483 |

TABLE 1-continued

| | Calcined product | | | Calcination temperature (°C.) | Sintering temperature (°C.) | Bending strength of sintered ceramics (MPa) | |
|---|---|---|---|---|---|---|---|
| Run No. | alkali metal oxide (ppm) | alkaline earth metal oxide (ppm) | total (ppm) | | | R.T. | 1300° C. |
| Comp. Ex. 1 | 750 | 700 | 1450 | 1200 | 1800 | 270 | 254 |
| 2 | 1100 | 650 | 1750 | " | 1650 | 284 | 448 |

Example 11

Figure 3:
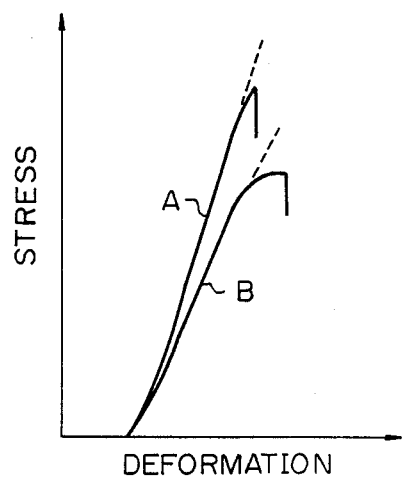
FIG. 3 is a stress-deformation diagram showing the influence of the alkali metal oxide content at 1,300° C. on the sample of sintered ceramics having an $Al_2O_3$ proportion of 70 wt % in FIG. 1.

The starting powder used in Example 1 in which the ratio of $Al_2O_3$ content was adjusted to 70% by weight, was treated under the same conditions as those used in Example 1 to provide sintered ceramics. The relationship between stress and deformation of the sintered ceramics was examined at 1,300° C. for varying alkali metal oxide content in the calcined powder. The test results are shown in FIG. 3 wherein curve A refers to the case of 500 ppm alkali and curve B to the case of 2,500 ppm alkali. As is clear from FIG. 3, the sintered ceramics produced by the process of the present invention were capable of withstanding high loads until they broke down.

What is claimed is:

1. A process for producing an alumina silica sintered ceramic having improved strength comprising the steps of:
   (A) synthesizing a starting powder mixture from a homogeneous mixed solution of aluminum and silica sources that is conditioned to provide a chemical composition wherein the ratio of $Al_2O_3$ content to the sum of $Al_2O_3$ and $SiO_2$ contents in the synthesized powder mixture is adjusted to the range of 62–73% by weight and the total content of $Na_2O$ and $K_2O$ as impurities in said powder is adjusted to no more than 1,000 ppm;
   (B) calcining said starting powder at a temperature of from about 950° to about 1,200° C.;
   (C) grinding said calcined product into particles and compressing the particles into a compact; and
   (D) sintering the compact at a temperature of from about 1,500 to about 1,700° C. and at atmospheric pressure so as to make the sintered ceramic having a room-temperature strength of at least 300 MPa and a hot (1,300° C.) strength of at least 400 MPa.

2. The process of claim 1 wherein said powder mixture is synthesized by spray pyrolysis of a solution obtained by dissolving in a solvent an aluminum salt and silicon alkoxide of the formula $Si_nO_{n-1}(OR)_{2n+2}$ ($n \geq 1$, R: alkyl group).

3. The process of claim 1 wherein the total content of $Na_2O$ and $K_2O$ as impurities in said powder mixture is adjusted to no more than 500 ppm.

4. The process of claim 1 wherein the ratio of $Al_2O_3$ content to the sum of $Al_2O_3$ and $SiO_2$ contents in said powder mixture is adjusted to the range of 65–70% by weight.

5. A process for producing an alumina silica sintered ceramic comprising the steps of:
   (A) synthesizing a starting powder from a homogeneous mixed solution of aluminum and silica sources that is conditioned to provide a chemical composition within the range of 62–73 wt % $Al_2O_3$ and correspondingly 38–27 wt % $SiO_2$;
   (B) calcining said starting powder at a temperature of from about 900 to about 1,450° C. for a period of at least half an hour to make a calcined product that is chiefly composed of a crystalline phase and which contains oxides of an alkali metal and an alkaline earth metal in a total amount of no more than 1,500 ppm;
   (C) grinding said calcined product into particles having an average size of no more than about 1.0 µm;
   (D) compressing the particles into a compact; and
   (E) sintering the compact in air or in an inert atmosphere at a temperature of from about 1,500° to about 1,750° C. and at atmospheric pressure so as to make the sintered ceramic having a room-temperature strength of at least 300 MPa and a hot (1,300° C.) strength of at least 400 MPa.

6. A process according to claim 5 wherein said starting powder is synthesized by first dissolving an aluminum salt and a silicon alkoxide in a solvent to form a homogeneous mixed solution and then subjecting said solution to spray pyrolysis.

7. A process according to claim 5 wherein said starting powder is synthesized by first preparing a homogeneous non-aqueous mixed solution of an aluminum alkoxide and a silicon alkoxide, then subjecting said solution to hydrolysis, and drying the resulting precipitate.

8. A process according to claim 5 wherein said starting powder is conditioned to have a chemical composition within the range of 62–72 wt % $Al_2O_3$ and 28–38 wt % $SiO_2$.

9. A process according to claim 5 wherein said starting powder is conditioned to have a chemical composition within the range of from 62 to less than 68 wt % $Al_2O_3$ and from more than 32 to 38 wt % $SiO_2$.

10. A process according to claim 5 wherein said calcined product contains no more than 1,000 ppm of an alkali metal oxide.

11. A process according to claim 5 wherein said calcined product contains oxides of an alkali metal and an alkaline earth metal in a total amount of no more than 1,000 ppm.

12. A process according to claim 5 wherein said starting powder is calcined at a temperature of 1,100°–1,400° C.

13. A process according to claim 5 wherein said compact is sintered at a temperature of 1,550°–1,700° C.

14. An alumina silica sintered ceramic that has a density of at least 95% of the theoretical value and which has a room-temperature of at least 300 MPa and a hot (1,300° C.) strength of at least 400 MPa, said sintered ceramic being produced by a process comprising the steps of:
   (A) synthesizing a starting powder from a homogeneous mixed solution of aluminum and silica sources that is conditioned to provide a chemical composition within the range of 62-73 wt % Al$_2$O$_3$ and correspondingly 38-27 wt % SiO$_2$;

(B) calcining said starting powder at a temperature of from about 900° to about 1,450° C. for a period of at least half an hour to make a calcined product that is chiefly composed of a crystalline phase and which contains oxides of an alkali metal and an alkaline earth metal in a total amount of no more than 1,500 ppm;

(C) grinding said calcined product into particles having an average size of no more than about 1.0 μm;

(D) compressing the particles into a compact; and (E) sintering the compact in air or in an inert atmosphere at a temperature of from about 1,500° to about 1,750° C. and at atmospheric pressure.

15. An alumina silica sintered ceramic according to claim 14 wherein said starting powder is synthesized by first dissolving an aluminum salt and a silicon alkoxide in a solvent to form a homogeneous mixed solution and then subjecting said solution to spray pyrolysis.

16. An alumina silica sintered ceramic according to claim 14 wherein said starting powder is synthesized by first preparing a homogeneous non-aqueous mixed solution of an aluminum alkoxide and a silicon alkoxide, then subjecting said solution to hydrolysis, and drying the resulting precipitate.

17. An alumina silica sintered ceramic according to claim 14 wherein said starting powder is conditioned to have a chemical composition within the range of 62-72 wt % Al$_2$O$_3$ and 28-38 Wt % SiO$_2$.

18. An alumina silica sintered ceramic according to claim 14 wherein said starting powder is conditioned to have a chemical composition within the range of from 62 to less than 68 wt % Al$_2$O$_3$ and from more than 32 to 38 wt % SiO$_2$.

19. An alumina silica sintered ceramic according to claim 14 wherein said calcined product contains no more than 1,000 ppm of an alkali metal oxide.

20. An alumina silica sintered ceramic according to claim 14 wherein said calcined product contains oxides of an alkali metal and an alkaline earth metal in a total amount of no more than 1,000 ppm.

21. An alumina silica sintered ceramic according to claim 14 wherein said starting powder is calcined at a temperature of 1,100°-1,400° C.

22. An alumina silica sintered ceramic according to claim 14 wherein said compact is sintered at a temperature of 1,550°-1,700° C.

* * * * *

UNITED STATES PATENT AND TRADEMARK OFFICE
CERTIFICATE OF CORRECTION

PATENT NO. : 4,895,814

DATED : January 23, 1990

INVENTOR(S) : KANZAKI et al

It is certified that error appears in the above-identified patent and that said Letters Patent is hereby corrected as shown below:

Title Page, [75] Inventors:

"Ohta Shigetoshi" as --Shigetoshi Ohta--.

"Yamagishi Chitake" as --Chitake Yamagishi--.

"Mitachi Senshu" as --Senshu Mitachi--.

Signed and Sealed this

Fifth Day of October, 1993

*Attest:*

BRUCE LEHMAN

*Attesting Officer*   *Commissioner of Patents and Trademarks*